United States Patent

Urbanek

[11] Patent Number: 5,922,371
[45] Date of Patent: Jul. 13, 1999

[54] INJECTION MOLDING APPARATUS INCLUDING FORCE SETTING DEVICE

[75] Inventor: Otto Urbanek, Linz, Austria

[73] Assignee: Engel Maschinenbau Gesellschaft m.b.H., Schwertberg, Austria

[21] Appl. No.: 08/985,635

[22] Filed: Dec. 4, 1997

Related U.S. Application Data

[62] Division of application No. 08/565,149, Nov. 30, 1995, abandoned.

[30] Foreign Application Priority Data

Nov. 30, 1994 [AT] Austria ................................. 463/94 U

[51] Int. Cl.$^6$ ..................................................... B29C 45/66
[52] U.S. Cl. .................. 425/590; 425/451.2; 425/451.5; 425/592
[58] Field of Search ..................................... 425/589, 590, 425/592, 593, 450.1, 451.5, 451.6, 150, 451.2, 595, 451.9

[56] References Cited

U.S. PATENT DOCUMENTS

| | | |
|---|---|---|
| 3,534,442 | 10/1970 | Mahle . |
| 3,642,405 | 2/1972 | Eggenberger ............................ 425/149 |
| 3,819,774 | 6/1974 | Eggenberger et al. . |
| 4,421,472 | 12/1983 | Martin, Jr. ................................ 425/527 |
| 4,615,669 | 10/1986 | Fujita et al. ............................ 425/147 |
| 4,880,368 | 11/1989 | Hasl et al. ............................... 425/116 |
| 4,968,239 | 11/1990 | Inaba et al. .............................. 425/150 |
| 5,454,709 | 10/1995 | Leonhartsberger et al. ............. 425/589 |
| 5,478,231 | 12/1995 | Hehl ........................................ 425/589 |
| 5,547,619 | 8/1996 | Obayashi ................................. 264/40.1 |
| 5,556,656 | 9/1996 | Lampl et al. ............................ 425/589 |
| 5,622,737 | 4/1997 | Hehl ........................................ 425/590 |
| 5,660,783 | 8/1997 | Urbanek et al. ....................... 264/328.1 |

Primary Examiner—James P. Mackey
Attorney, Agent, or Firm—Wenderoth, Lind & Ponack, L.L.P.

[57] ABSTRACT

An injection molding apparatus includes stationary and movable die carrier plates. The movable die carrier plate can be moved in a direction toward the stationary die carrier plate during a quick stroke and can be pressed toward the stationary die carrier plate during a power stroke. An electric motor has an output. A member is connected between the output and the movable die carrier plate to transmit movement of the output to the movable die carrier plate to move the movable die carrier plate during the quick stroke. A force setting device is responsive to a force acting between the output and the movable die carrier plate to interrupt transmission of movement of the output to the movable die carrier plate at a changeover between the quick stroke and the power stroke when the force exceeds a predetermined value. Thereafter, further movement of the output to press the movable die carrier plate toward the stationary die carrier plate during the power stroke is achieved by a power transmitting device connected between the output and the movable die carrier plate.

15 Claims, 1 Drawing Sheet

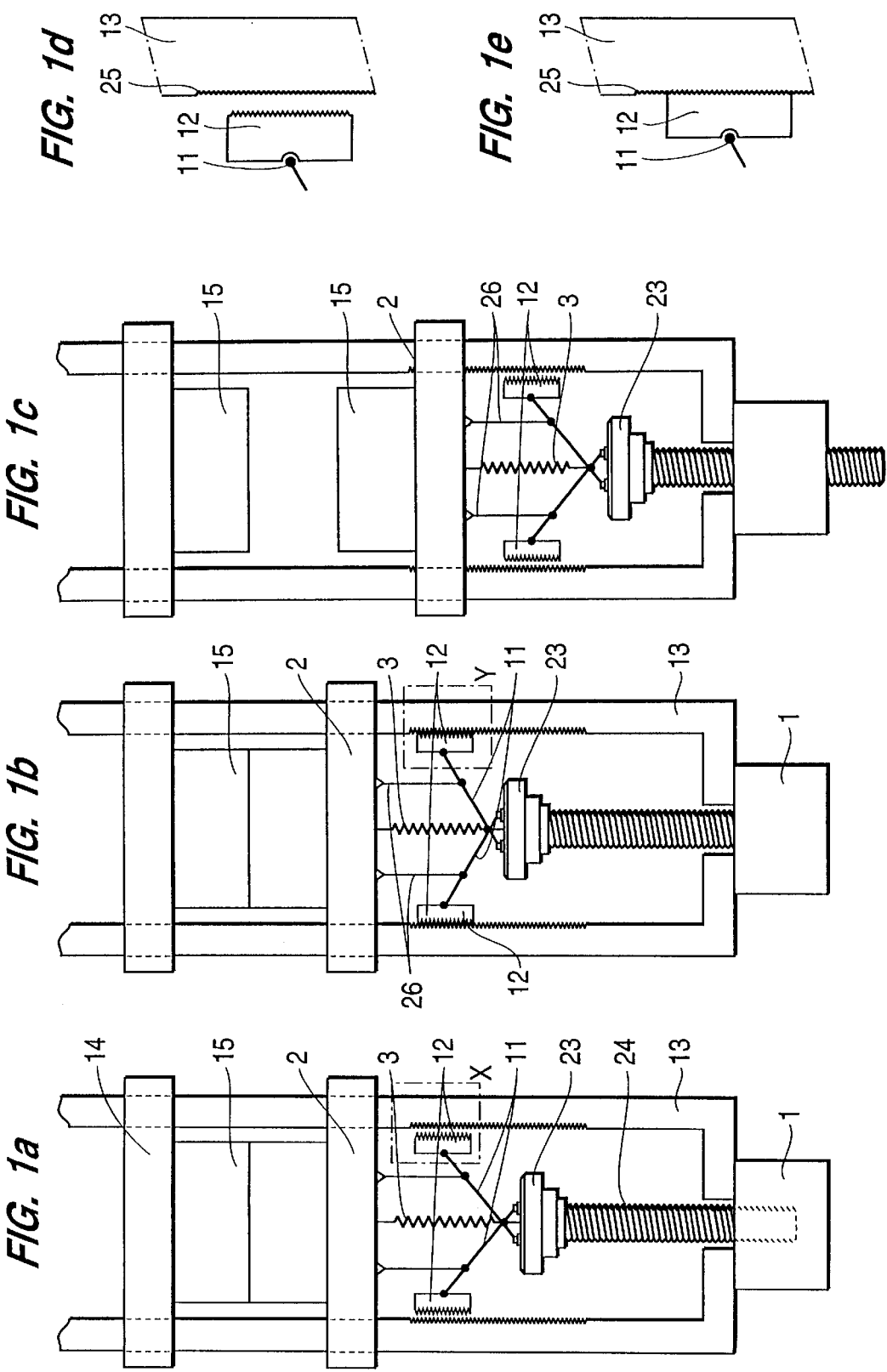

ions of the movable die carrier plate is
INJECTION MOLDING APPARATUS INCLUDING FORCE SETTING DEVICE This is a divisional application of Ser. No. 08/565,149, filed Nov. 30, 1995, now abandoned.

BACKGROUND OF THE INVENTION

The present invention relates to an injection molding apparatus for the injection molding of plastic material. The present invention particularly relates to such an apparatus including stationary and movable die carrier plates to carry respective mold parts, the movable die carrier plate being mounted to be moved in a direction toward the stationary die carrier plate during a quick stroke to close the mold parts and to be pressed toward the stationary die carrier plate during a power stroke during which injection molding within the mold parts occurs. Yet further, the present invention relates to such an apparatus wherein a single electric motor is employed to perform, through a member connected between an output of the electric motor and the movable die carrier plate, movement of the movable die carrier plate toward the stationary die carrier plate during the quick stroke to close the mold parts. However, upon changeover between the quick stroke and the power stroke, a force setting device responsive to a force acting between the output and the movable die carrier plate interrupts transmission of such movement when the force exceeds a predetermined value, and thereafter a power transmitting device connected between the output and the movable die carrier plate operates to cause further movement of the output to press the movable die carrier plate toward the stationary die carrier plate during the power stroke.

In known apparatuses of this type, i.e. employing an electric motor as a power source, for example as shown in U.S. Pat. No. 4,986,239, the changeover from the quick stroke to the power stroke occurs as soon as the movable die carrier plate has reached a desired final position. In such known arrangement however, in the event that a foreign object becomes positioned between the two mold halves, operation can be impaired.

SUMMARY OF THE INVENTION

An object of the present invention is to provide an injection molding apparatus of the above general described type, but wherein it is possible to overcome the above and other prior art disadvantages.

The present invention proceeds from the consideration that it is more advantageous to perform the desired changeover from the quick stroke to the power stroke, not as a function of the position of the movable die carrier plate, but as a function of the resistance which opposes further movement of the movable die carrier plate. By such arrangement in accordance with the present invention, there is achieved in a simple manner a mold protection mechanism that protects the mold parts in the event that a foreign object comes between the mold parts. This is achieved since, in accordance with the present invention, movement of the movable die carrier plate is impeded by any such foreign object in the same manner as if the two mold halves had been brought together during a normal operation.

Particularly in accordance with the present invention, there is provided an electric motor having an output movable by operation of the motor. A member is connected between the output and the movable die carrier plate and is operable to transmit movement of the output to the movable die carrier plate to move the movable die carrier plate toward the stationary die carrier plate during the quick stroke to close the mold parts. A force setting device is responsive to a force acting between the output and the movable die carrier plate to interrupt transmission of the movement of the output to the movable die carrier plate at a changeover between the quick stroke and the power stroke when such force exceeds a predetermined value. Thereafter, further movement of the output to press the movable die carrier plate toward the stationary die carrier plate during the power stroke is achieved by a power transmitting device connected between the output and the movable die carrier plate.

The force setting device may be in the form of a preloaded compression spring or a hydraulic unit which may be closed by an overpressure valve. The power transmitting device and the force transmitting device may be integrated into a structural arrangement that essentially provides a separate gearing between the electric motor and the movable die carrier plate. The power transmitting device essentially is taken out of operation or is inoperable when the force acting between the output and the movable die carrier plate is below the predetermined force value. The predetermined value can be established, set or adjusted by adjusting the particular force setting device employed, for example the preloading of a compression spring or the setting of an overpressure valve of a hydraulic unit. The force setting device also could be in the form of other structures as would be understood by one of ordinary skill in the art, for example a torque overload clutch or a torque pick-up of the electric motor.

In accordance with one feature of the present invention, the power transmitting device is in the form of a lever that is pivotable relative to the output and that carries a stop that, upon pivoting of the lever, is braced against a stationary frame of the apparatus by the further movement or pressure operation of the output of the electric motor. The power transmitting device further may include a strut between the lever and the movable die carrier plate, such that the further movement or pressure operation of the output is transmitted through the lever and the strut to the movable die carrier plate. The stop and/or the frame may have catch members, for example in the form of roughened surfaces or intermeshing gears, to ensure bracing therebetween.

BRIEF DESCRIPTION OF THE DRAWINGS

Other objects, features and advantages will be apparent from the following detailed description of a preferred embodiment, with reference to the accompanying drawings, wherein:

FIG. 1a is a schematic view of an embodiment of the present invention shown in a mold closed position at the end of a quick stroke;

FIG. 1b is a view similar to FIG. 1a, but illustrating the apparatus during a power stroke;

FIG. 1c is a view similar to FIGS. 1a and 1b, but illustrating the apparatus in a mold open position or during a quick stroke;

FIG. 1d is an enlarged view of detail X of FIG. 1a; and

FIG. 1e is an enlarged view of detail Y of FIG. 1b.

DETAILED DESCRIPTION OF THE INVENTION

Shown in FIGS. 1a–1c is an injection molding apparatus in accordance with an embodiment of the present invention. Such apparatus includes a stationary machine frame 13 having mounted thereon a stationary die carrier plate 14 and a movable die carrier plate 2, die carrier plates 14, 2 being shown carrying respective injection mold halves 15.

An electric motor 1 is rigidly and fixedly mounted on frame 13 and includes an output that is linearly movable by operation of motor 1. In the illustrated arrangement, such output is in the form of a spindle 24 producing a linear motion of a bracket 23. It is contemplated that spindle 24 is a threaded spindle threaded in a mounting of the motor or in frame 13. Thus, operation of motor 1 results in linear movement of spindle 24 and bracket 23.

Connected between bracket 23 and movable die carrier plate 2 are a pair of pivotable levers 11, a pair of struts 26 and a preloaded compression spring 3. Levers 11 carry respective stops 12.

It is believed that operation of the apparatus in accordance with this embodiment of the present invention will be apparent from the above description and the drawings. However, such operation briefly now will be described.

FIG. 1c illustrates the apparatus in a mold open position wherein movable die carrier plate 2 is spaced from stationary die carrier plate 14 and the mold halves 15 are open. Operation of motor 1 will cause spindle 24 and bracket 23 to move linearly toward the stationary die carrier plate 14. This movement is transmitted to the movable die carrier plate 2 to thereby achieve movement thereof to a mold closed position shown in FIG. 1a. This is a quick stroke, and the movement of the output 24 of motor 1 is transmitted directly to movable die carrier plate 2 via levers 11, spring 3 and struts 26. Spring 3 has a predetermined load, and during the quick stroke the force acting on spring 3 between movable die carrier plate 2 and output 24, 23 is less than the force required to compress spring 3. However, after the movable die carrier plate 2 is moved to the mold closed position of FIG. 1a, further operation of motor 1 and thus further movement of output 24, 23 will cause the force acting on spring 3 between movable die carrier plate and output 24, 23 to exceed a predetermined force value at which spring 3 is compressed. When this occurs, pivotable levers 11 will pivot relative to bracket 23 from the position shown in FIG. 1a to the position shown in FIG. 1b. This represents a changeover from the quick stroke to the power stroke. This pivoting of levers 11 will cause stops 12 to be pressed in bracing contact against frame 13. This will cause movable die carrier plate 2 to be pressed toward stationary die carrier plate 14, thus pressing the mold halves together during an injection molding operation. Thus, operation of motor 1 will cause bracing of stops 12 against frame 13 and pressing of spindle 24, bracket 23 via levers 11 and struts 26 against movable die carrier plate 2. As shown in FIGS. 1d and 1e, either one or both of stops 12 and frame 13 may be provided with catch members 25 to ensure bracing therebetween. Such catch members may be in the form of roughened surfaces, stippled surfaces or intermeshing teeth. Upon completion of an injection molding operation, the motor 1 is then operated reversely to cause spindle 24 and bracket 23 to move in a direction from the position of FIG. 1a to the position of FIG. 1c. This releases the pressing force, thereby allowing spring 3 to relax and withdrawing stops 12 from bracing against frame 13. When the mold halves 15 are open, movement of movable die carrier plate 2 and bracket 23 from the position of FIG. 1a to the position of FIG. 1c occur synchronously.

The present invention has been described and illustrated with respect to a preferred and advantageous embodiment thereof. However, it is to be understood that various change and modifications to the specifically described structures may be made without departing from the spirit and scope of the present invention. For example, force setting device 3 could be in the form of, rather than the compressing spring 3, a hydraulic unit including an overpressure valve. Also, the force setting device could be in the form of a torque overload clutch or a torque pick-up associated with electric motor 1. Also, the power transmitting device could be structure other than pivotable levers 11, struts 26 and stops 12. Further, the output of motor 1 could be other than the threaded spindle 24. However, the illustrated and described structural features represent a particularly advantageous arrangement and embodiment of the present invention.

I claim:

1. An injection molding apparatus comprising:

stationary and movable die carrier plates to carry respective mold parts, said movable die carrier plate being mounted to be moved in a direction toward said stationary die carrier plate during a quick stroke to close the mold parts and to be pressed toward said stationary die carrier plate during a power stroke during injection molding within the mold parts;

an electric motor having an output movable by operation of said motor;

a member connected between said output of said electric motor and said movable die carrier plate and operable to transmit movement of said output to said movable die carrier plate to move said movable die carrier plate in said direction during said quick stroke to close the mold parts;

a force setting device responsive to a force acting between said output and said movable die carrier plate to interrupt transmission of said movement of said output to said movable die carrier plate at a changeover between said quick stroke and said power stroke when said force exceeds a predetermined value; and a power transmitting device connected between said output and said movable die carrier plate and operable to, upon interruption of said transmission of said movement, cause further movement of said output to press said movable die carrier plate toward said stationary die carrier plate during said power stroke.

2. An apparatus as claimed in claim 1, wherein said force setting device is connected between said output and said movable die carrier plate.

3. An apparatus as claimed in claim 1, wherein said force setting device comprises a spring operable to be compressed when said force exceeds said predetermined value.

4. An apparatus as claimed in claim 1, wherein said output comprises a spindle mounted to be driven linearly in said direction by said motor.

5. An apparatus as claimed in claim 4, further comprising a bracket carried by said spindle, said force setting device being positioned between said bracket and said movable die carrier plate.

6. An apparatus as claimed in claim 5, wherein said power transmitting device comprises a lever connected to said bracket and carrying a stop to be braced against a stationary frame of said apparatus upon said further movement.

7. An apparatus as claimed in claim 6, wherein said lever is pivotable to brace said stop against said frame.

8. An apparatus as claimed in claim 7, wherein said power transmitting device further comprises a strut between said lever and said movable die carrier plate, such that said further movement is transmitted through said lever and said strut to said movable die carrier plate.

9. An apparatus as claimed in claim 8, comprising plural pivotable levers to brace plural stops against said frame, and plural struts between respective said levers and said movable die carrier plate.

10. An apparatus as claimed in claim 6, wherein at least one of said stop and said frame have catch members to ensure bracing therebetween.

11. An apparatus as claimed in claim 1, wherein said power transmitting device is carried by said output and carries a stop to be braced against a stationary frame of said apparatus upon said further movement.

12. An apparatus as claimed in claim 11, wherein said power transmitting device comprises a lever pivotable relative to said output upon said further movement.

13. An apparatus as claimed in claim 12, wherein said power transmitting device further comprises a strut between said lever and said movable die carrier plate, such that said further movement is transmitted through said lever and said strut to said movable die carrier plate.

14. An apparatus as claimed in claim 13, comprising plural pivotable levers to brace plural stops against said frame, and plural struts between respective said levers and said movable die carrier plate.

15. An apparatus as claimed in claim 11, wherein at least one of said stop and said frame have catch members to ensure bracing therebetween.

\* \* \* \* \*